United States Patent [19]

Hargraves

[11] 4,102,526

[45] Jul. 25, 1978

[54] SOLENOID VALVE

[76] Inventor: Donald E. Hargraves, 54 Harbor St., Pepperell, Mass. 01463

[21] Appl. No.: 771,185

[22] Filed: Feb. 23, 1977

[51] Int. Cl.² .................. F16K 31/06; F16K 11/04
[52] U.S. Cl. .............................. 251/139; 137/625.65; 251/141; 361/405
[58] Field of Search .................. 137/315, 343, 454.2, 137/625.5, 625.65; 251/139, 141; 335/199; 361/400, 404, 405

[56] References Cited

U.S. PATENT DOCUMENTS

| 2,614,584 | 10/1952 | Goepfrich | 251/139 |
| 3,142,784 | 7/1964 | Bloomfield | 335/199 X |
| 3,215,794 | 11/1965 | Zielinski | 361/405 X |
| 3,263,959 | 8/1966 | Wisniewski | 251/141 |
| 3,977,436 | 8/1976 | Larner | 137/625.65 |

Primary Examiner—Gerald A. Michalsky

Attorney, Agent, or Firm—Wolf, Greenfield & Sacks

[57] ABSTRACT

An electrically controlled valve is arranged to be mounted on a printed circuit without requiring any fasteners other than the terminals which provide electrical connections to the coil of a solenoid. The valve has three ports arranged to permit one of the ports to be selectively connected to either one of the other two ports. The plunger of the solenoid is disposed in a receiver that extends into the central longitudinal passage of the solenoid coil which establishes a magnetic field when the coil is electrically energized. A spring causes the plunger to seal off one port when the coil is unenergized. In that position of the plunger the other two ports are connected by channels in the plunger. Upon electrical energization of the coil, the plunger moves to a new position where it seals off a different one of the three ports while opening a connecting passage between the remaining two ports.

2 Claims, 3 Drawing Figures

SOLENOID VALVE

FIELD OF THE INVENTION

This invention relates in general to valves of the type actuated by electrical energization of a solenoid. More particularly, the invention pertains to a valve mechanism that can be used to control fluid flow or that can be used to control the transmission of pneumatic or hydraulic pressure and that can be used to enable a vacuum to be selectively applied to the parts of the valve.

BACKGROUND OF THE INVENTION

In recent years, advances in medical electronics and in other areas where electronic control is used have created a need for pneumatic and hydraulic mechanisms that are compatible with electronic circuitry. Because medical electronic devices are usually used in the treatment of one patient at a time, the volume of air or fluid required in the treatment usually is not large so that the pneumatic and hydraulic valve mechanisms can be of relatively small size. The speed capability of electronic circuitry, furthermore, requires pneumatic and hydraulic mechanisms that can act more quickly than the large and bulky mechanisms that are now commonly employed.

OBJECTS OF THE INVENTION

The primary object of the invention is to provide a solenoid valve which can readily be mounted on a printed circuit board without requiring special attachment hardware and thus promoting the marriage of electronic and pneumatic circuitry in a single package. A further object of the invention is to provide a solenoid controlled mechanism in which the valve plunger is of small mass and is in such close proximity to the valve seats that the response time of the mechanism is very fast.

THE DRAWINGS

The invention, both as to its construction and mode of operation, can be better understood from the following detailed description when that description is considered in conjuction with the accompanying drawings in which FIG. 1 is a perspective view of the preferred three port embodiment of the invention, FIG. 2 is a sectional view showing the internal structure of the preferred three port embodiment, and FIG. 3 is a view showing the channels in the plunger of the solenoid.

DETAILED DESCRIPTION OF PREFERRED EMBODIMENT

Figure 1:
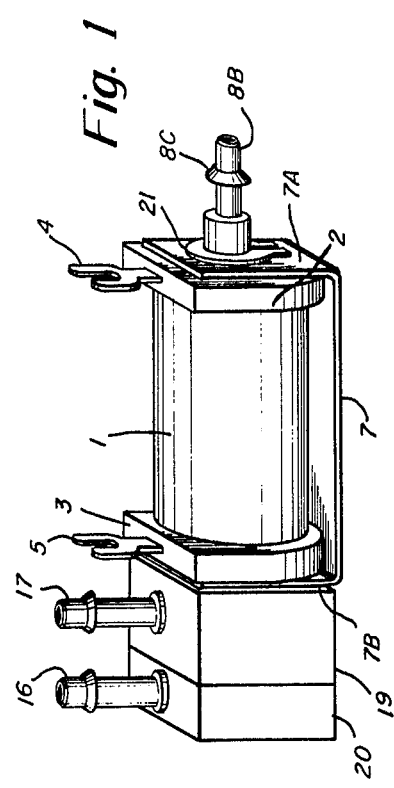
Figure 2:
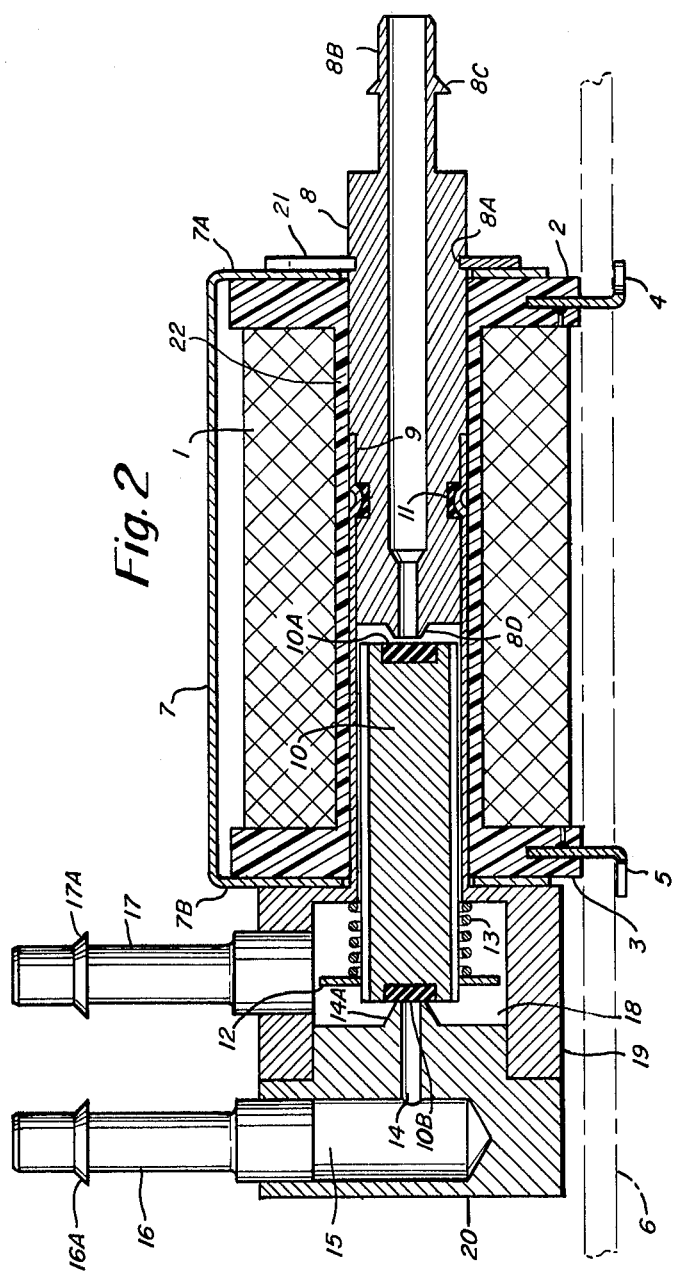

The preferred embodiment of the invention depicted in FIGS. 1 and 2 of the drawings is a three port device that employs a coil 1 would upon a form having end flanges 2 and 3 fixed to a hollow cylindrical core 22. Protruding from and supported by the end flanges 2 and 3 are terminals 4 and 5. The ends of coil 1 are connected to the terminals to enable the coil to be electrically energized through these terminals. For ease in mounting the device on the printed circuit board 6 which is shown in phantom in FIGS. 2, the terminals are intended to be inserted through holes in the board and then bent over to clamp the board between the straight edges of the flanges 2 and 3 and the bent terminals. By soldering the terminals to the printed circuit wiring on the board, electrical leads are established for enabling the solenoid to be electrically energized and the device is rigidly secured to the board without requiring screws, nuts or other fasteners.

To furnish a low reluctance path for the magnetic flux of the field set up by the energized coil of the solenoid, a U-shaped yoke 7 of a material of high magnetic permeability extends over the end flanges 2 and 3. The two legs 7A and 7B of the yoke have central openings which align with the passage in the core 22 of the coil form as shown in FIG. 2.

Disposed in the passage in the core 22 is a tube 8 of magnetizable material. One end of tube 8 protrudes from the core and has a groove 8A which accepts a retaining ring 21. The retainer 21 is of the split ring type whose ends can be spread apart to permit the ring to be slipped over the tube. The protruding end 8B of tube 8 preferably is reduced in diameter and is provided with a barbed collar 8C. A flexible pipe can be slipped over the barbed end of the tube 8 to communicate with the passage extending centrally through tube 8. Inadvertent disconnection of the flexible pipe is prevented by the barbed collar which resists withdrawal of the pipe.

Crimped around tube 8 is a hollow cylindrical receiver 9 which is preferably of a non-magnetic material such as brass. To provide a fluid tight or air tight seal, the tube 8 in the vicinity of the crimp is provided with a packing 11. Slidably disposed in receiver 9 is the plunger 10 of the solenoid. The plunger is of magnetizable material. At one end of the plunger is a flange 12 against which a helical spring 13 presses in the direction urging the plunger to move to the left as viewed in FIG. 2. The tube 8 and plunger 10 are preferably made of soft iron or a similar material that can be easily magnetized by the magnetic field. Upon energization of coil 1 of the solenoid, the plunger is attracted by the adjacent end of tube 8 and moves to the right as viewed in FIG. 2. When moved to the right, seat 10A of the plunger seals the port 8D of tube 8. When moved to the left, seat 10B of the plunger seals port 14A of a passage 14 that communicates with a chamber 15 in an end member 20. Extending from chamber 15 is a hollow tube 16 having a barbed collar 16A. Adjacent to tube 16 is another hollow tube 17 that also carries a barbed collar 17A. The tube 17 extends from the chamber 18 into which the spring biased end of the plunger protrudes from the receiver. Chamber 18 is formed by a housing 19 into which is pressed a mating portion of end member 20 which acts as a partition wall between chambers 15 and 18. Passage 14 is situated in the partition wall.

Figure 3:
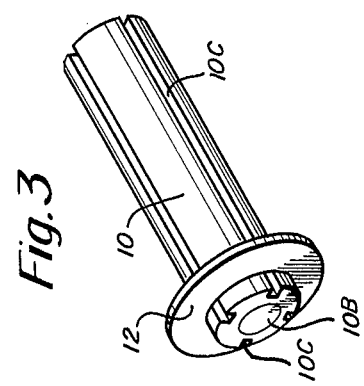

Passage 14 extends between chambers 15 and 18 and that passage is closed when seat 10B of the plunger seals port 14A. In that position of the plunger, port 8D is open. To enable that open port to communicate with chamber 18, plunger 10, as shown in FIG. 3, has longitudinally extending peripheral channels 10C through which a gas or a liquid can flow.

The housing 19 and end member 20 are preferably made of non-magnetic material so as not to divert the magnetic flux established by the solenoid. In FIG. 2, receiver 9 is depicted as being integral with the housing 19. It is evident that the receiver can be a separate part that is attached to the housing to form a rigid unit.

In the embodiment depicted in FIG. 2, plunger 10 is caused to move to the right by the coil's magnatic field because the plunger tends to take the position in the core that provides the path of least reluctance for the magnetic flux. Consequently, even if tube 8 were wholly or partly made of non-magnetic material, the plunger 10 will still tend to move to the right as viewed in FIG. 2 of the coil. Where both the tube 8 and plunger 10 are of magnetic material, upon energization of the coil, the plunger moves to the position where the gap between the plunger and the tube is a minimum.

As shown in FIG. 1, housing 19 and end member 20 form a cube having tubes 16 and 17 protruding from one of its faces. The cube, tube 9, plunger 10, and tube 8, can turn as a unit relative to the core 22 of the solenoid. Consequently, the cube can be turned to cause tubes 16 and 17 to be oriented in any one of four directions. When mounted on a printed circuit board, the flat surface of the cube which faces the board prevents the cube from turning because that surface is spaced only slightly above the board as is evident from FIG. 2. By removing retaining ring 21, the entire valve assembly can be pulled out and separated from the coil assembly. That feature enables the valve assembly to be easily removed for servicing or for replacement without requiring detachment of the coil from the circuit board.

While the invention is illustrated in the form of a valve mechanism having three ports it is readily apparent that one port can be eliminated or closed off and the device can then be used as a two port valve mechanism. Further, it is evident that the tubes having the barbed collars are intended to accept flexible pipes of a material that permits the barbed collars to bite into the walls of the flexible pipes to prevent the pipes from being inadvertently pulled off. The barbed collar tubes can, of course, be replaced by threaded couplings or by other types of tubing connectors.

I claim:

1. In an electrically controlled valve of the type having
   (1) a coil for establishing a magnetic field, the coil surrounding a core having through it a central longitudinal passage,
   (2) a hollow elongate receiver extending into the central passage of the core,
   (3) a pipe of magnetic material, the pipe extending into the central passage, the pipe being fixed to the receiver and having a port arranged to be closed by the seating of a member against the port,
   (4) a plunger disposed to slide in the receiver, the plunger being magnetically attracted toward the pipe upon the establishment of a magnetic field by the coil and being adapted to seat against the aforesaid port of the pipe to close that port,
   (5) a housing to which the receiver is attached, the housing having a first port therein, and
   (6) means providing communication between the first port of the housing and the aforesaid port of the pipe when that port is open,
   the improvement wherein
      the core has a pair of spaced flanges between which the coil is situated, each flange having a flat face adapted to seat against a supporting surface such as a printed circuit board, and
   the improvement further comprising
      electrical terminals extending from the flanges, the coil being electrically connected to those terminals whereby the coil can be electrically energized.

2. The improvement according to claim 1 wherein the housing, receiver, and pipe form a rigid unit that can rotate relative to the core
   and the improvement further comprises
      locking means on the pipe for locking the core between the housing and the locking means whereby the first port of the housing can be oriented in a plurality of directions by turning the rigid unit.

* * * * *